United States Patent [19]

Ondush et al.

[11] Patent Number: 5,195,695
[45] Date of Patent: Mar. 23, 1993

[54] APPARATUS FOR FINE GRINDING

[75] Inventors: Andrew P. Ondush, Catasauqua; Richard D. Ritter, Bath; Arthur H. Anderson, Allentown, all of Pa.

[73] Assignee: Air Products and Chemicals, Inc., Allentown, Pa.

[21] Appl. No.: 490,246

[22] Filed: Mar. 8, 1990

Related U.S. Application Data

[60] Division of Ser. No. 297,222, Jan. 13, 1989, abandoned, which is a continuation-in-part of Ser. No. 125,638, Nov. 25, 1987, abandoned.

[51] Int. Cl.$^5$ .................... B02C 23/06; B02C 23/18
[52] U.S. Cl. ........................ 241/38; 241/48; 241/188.1
[58] Field of Search .................. 241/17, 18, 19, 23, 241/5, DIG. 37, DIG. 14, 38, 39, 48, 79.1, 188.1, 188.2, 53

[56] References Cited

U.S. PATENT DOCUMENTS

| | | | |
|---|---|---|---|
| 2,609,150 | 9/1952 | Bludeau | 241/15 |
| 2,753,121 | 7/1956 | Elfenbein | 241/38 X |
| 3,285,523 | 11/1966 | Duyckinck et al. | 241/53 |
| 3,329,350 | 7/1967 | Wisgerhof et al. | 241/38 |
| 3,965,267 | 6/1976 | Davis | 241/23 X |
| 4,641,787 | 2/1987 | Petersen et al. | 241/53 |

Primary Examiner—Joseph M. Gorski
Attorney, Agent, or Firm—James C. Simmons; William F. Marsh

[57] ABSTRACT

A method and apparatus for fine grinding materials normally difficult to grind at ambient temperature, e.g. plastic and elastomeric materials in a fluid classification type impact mill utilizing liquid cryogen to pre-cool the material to be ground, to cool the material and the mill during grinding and to recycle vaporized cryogen from the mill back into the mill as the medium for conveying material to be ground into the mill.

6 Claims, 3 Drawing Sheets

5,195,695

APPARATUS FOR FINE GRINDING

This Application is a division of U.S. Pat. application Ser. No. 07/297,222 filed Jan. 13, 1989, is a Continuation-in-part of U.S. Pat. application Ser. No. 07/125,638 filed Nov. 25, 1987, both now abandoned.

TECHNICAL FIELD

The present invention pertains to fine grinding and especially to fine grinding of plastic and elastomeric materials.

BACKGROUND OF THE PRIOR ART

Fine grinding, pulverizing or size reduction all terms used to denote comminution of relatively soft or resilient materials such as rubbers and plastics has been the subject of a great deal of interest and research for many years. In particular the rubber and plastics industry has been interested in fine grinding scrap or reject material in order to recycle the material for reuse. However, in order to make effective use of recycle material the recycle material must be ground to a particle size finer than 80 mesh in order to be mixed with virgin material for reuse.

An effective and economically cost justifiable fine grinding system would be an asset to the rubber and plastics industry because of the various states and the federal government making it more and more difficult to dispose of scrap rubber and plastic material. Currently there is no economical process for producing powdered rubber or plastic of a particle size finer than 80 mesh. Thus large amounts of scrap and reject material are being stockpiled for recycle or disposition in accordance with current environmental laws.

In the past several attempts have been made to solve the problem of fine grinding by utilizing different types of grinding (pulverizing, size reducing or comminution) mills which incorporate a liquid cryogen such as liquid nitrogen either before or inside the mill.

For example conventional hammer mills have utilized liquid nitrogen both inside the mill and before the mill in a pre-cooler. However over the past decade within which these devices have been used it has been found that the hammer mill cannot grind the tough rubber and plastics economically because of the excessive amount of liquid nitrogen required.

Attrition mills have also been modified to use liquid nitrogen both inside and before the mill in a pre-cooler. This also has been done for about 10 years and it is known that the attrition mill cannot grind the tough rubber and plastics economically due to excessive plate wear inside the mill.

Lastly air-swept impact mills (fluid classification mills) have been utilized with nitrogen to pre-cool the material to be ground. Although a fine ground material was obtained the economics of the process were unfavorable due to the excessive amounts of liquid nitrogen required.

The art is replete with various types of schemes to utilize liquid nitrogen in combination with a grinding mill to effect the grinding of normally resilient or soft materials. U.S. Pat. Nos. 2,609,150, 2,735,624, 2,919,862, 3,614,001, 3,771,729 and 4,273,294 illustrate the use of a liquid cryogen (liquid nitrogen) to pre-cool and/or cool the grinding mill to achieve a ground product.

U.S. Pat. No. 3,771,729 shows a particularly effective pre-cooling apparatus for conditioning the material for grinding.

Other techniques for grinding materials that are normally soft, viscous, plastic or elastomeric in nature at room temperature are illustrated in U.S. Pat. Nos. 441,951, 637,465, 2,467,318, 3,314,802, 2,347,464, 2,435,503, 2,583,697, 3,647,149, 3,658,259, 2,665,850, 3,734,412, 2,836,368, 2,893,216, 2,974,883, 3,319,895.

SUMMARY OF THE INVENTION

The present invention pertains to an economical method and apparatus for fine grinding (e.g. to a −80 mesh particle size) of plastic and elastomeric materials utilizing a fluid classification impact grinding mill combined with a liquid cryogen system to pre-cool the material to be ground, utilizing liquid cryogen inside the mill to cool the material during grinding which also cools the mill and recycling vaporized liquid cryogen for use as the classifying fluid or the sweep fluid for the mill.

DETAILED DESCRIPTION OF THE INVENTION

Figure 1:
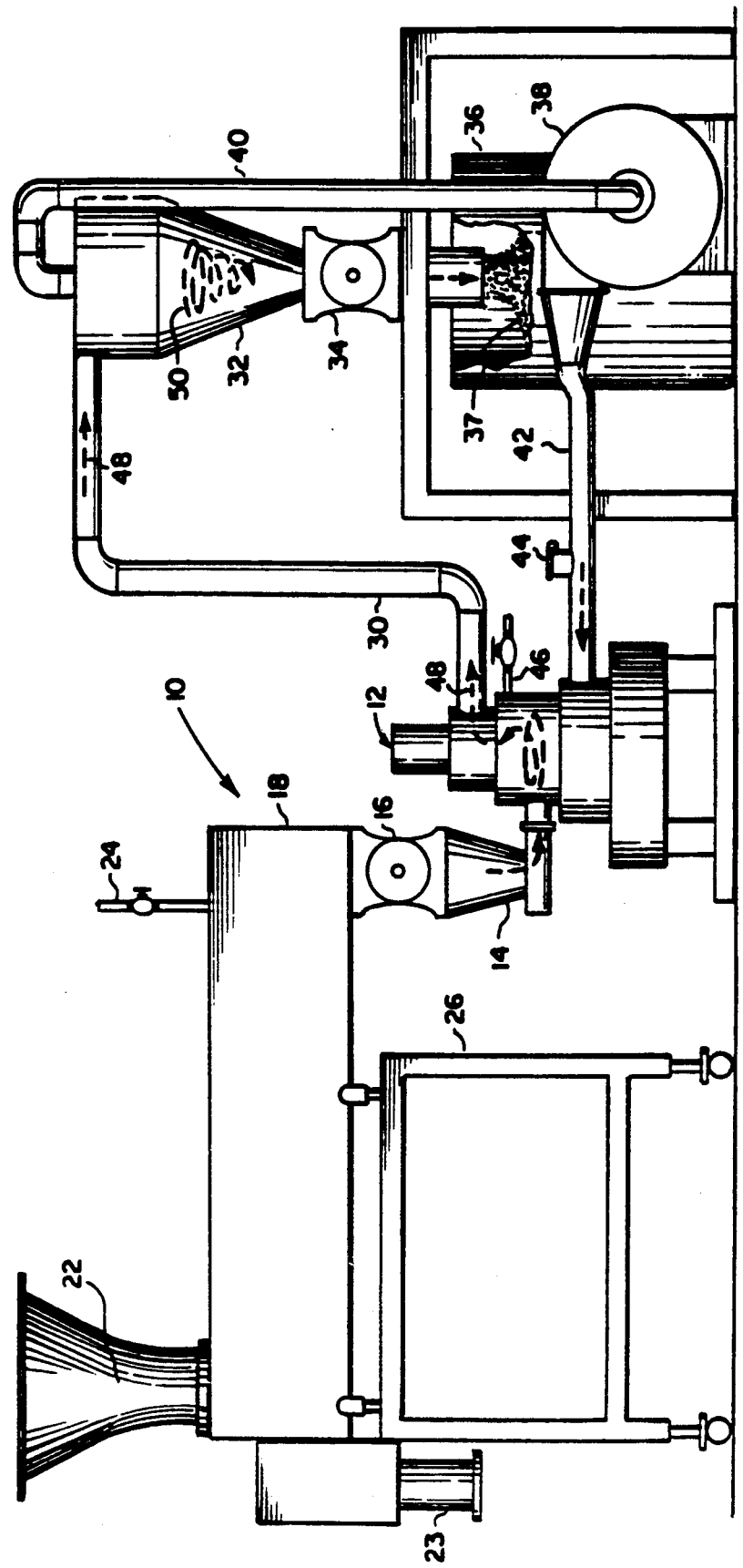
FIG. 1 is a schematic elevational view of the system and method according to the present invention.

Referring to FIG. 1 the overall system according to the invention is designated generally by the numeral 10. System 10 includes as the central apparatus a fluid classification impact mill 12 such as offered for sale by Mikropul Division of Hosokawa Micron International Inc., Summit, NJ, 07910, under the product designation ACM Micro Pulverizer.

Material is conveyed to the mill 12 for grinding by means of a transition chute 14 which is connected to an air lock 16 which in turn is connected to a cooling conveyor 18. Cooling conveyor 18 is preferably of the type shown and described in U.S. Pat. No. 3,771,729 and offered for sale by Air Products and Chemicals, Inc., Trexlertown, Pa. under the CryoGrind trademark. Cooling conveyor 18 has a feed hopper 22 as well as a conduit 24 for admitting liquid cryogen to the conveyor as shown in the '729 patent. Conveyor 18 can be of any type that will provide means for pre-cooling the material to be ground to its embrittlement temperature. Cooling conveyor 18 can be conveniently disposed on a portable carriage or table 26 and includes dive mechanism 23. Downstream of mill 12 and connected to mill 12 via suitable piping 30 is a separator 32 such as a cyclone separator. Cyclone separator 32 has disposed at its discharge opening an air lock 34 to permit discharge of the product into a receptacle or drum 36 without opening the system to ambient atmosphere.

A recycle blower 38 receives the vaporized cryogen exiting mill 12, after separation of the product 37 through suitable fluid tight connections and piping 40. Recycle blower 38 conveys the separated vaporized cryogen back to the mill 12 by means of conduit assembly 42 which includes a pressure relief valve 44.

A suitable conduit 46 conveys liquid cryogen to the mill 12 in a manner as will hereinafter be more fully disclosed.

The process according to the invention as practiced in the apparatus or system of FIG. 1 takes place by introducing material to be ground to the cooling conveyor 18 by means of the hopper 22 and air lock 20. As the material is conveyed through the cooling conveyor 18 it is pre-cooled by liquid nitrogen introduced to the cooling conveyor through conduit 24 to cool the material to its embrittling temperature. The material after cooling in cooling conveyor 18 is conveyed through a suitable air lock 16 and transition chute 14 to the fluid classification impact mill 12. As is well known in the art mill 12 can be adjusted to provide product of a given fineness. In the case of the present invention the mill is set to grind the starting material to a size that will pass through an 80 mesh (U.S. Standard) screen. The fine ground material entrained in vaporized cryogen exits the mill 12 in the direction shown by arrow 48 and enters the classifier or cyclone 32 where the particles shown by arrow 50 are separated from the vaporized cryogen and collected as product 37 in product drum 36. The vaporized cryogen exiting the cyclone 32 is conveyed by conduit 40 to the inlet or suction side of blower 38 whereby it is recycled to the fluid classification mill 12 to be used as the classification fluid as will the present invention can be finely ground very economically and effectively. The process is economical because the vaporized cryogen is recycled to be used as a classification fluid, the fluid classification mill 12 grinds materials very efficiently, and the low temperature of the vaporized cryogen is utilized as an aid in cooling of the incoming product and the mill.

The process according to the present invention can be operated effectively with the following process conditions:

TABLE 1

| Piece of Equipment | Process Variable | Operating Limits |
| --- | --- | --- |
| Cooling Conveyor | Temperature | 0° F. to −320° F. |
| Cooling Conveyor | Speed | 0 to 34 rpm |
| Fluid Classification Mill | Temperature | +70° F. to −320° F. |
| Fluid Classification Mill | Classifier Speed | 0 to 5000 rpm |
| Blower | Speed | 100 to 3500 rpm |

Most common materials can be ground to size utilizing the parameters set out above. Experimentation has shown if the process is operated significantly outside the above limits the particle size required cannot be produced economically.

Scrap or recycle tire tread has been ground successfully utilizing the process of the present invention which material has been incorporated into virgin material for remolding.

Figure 2:
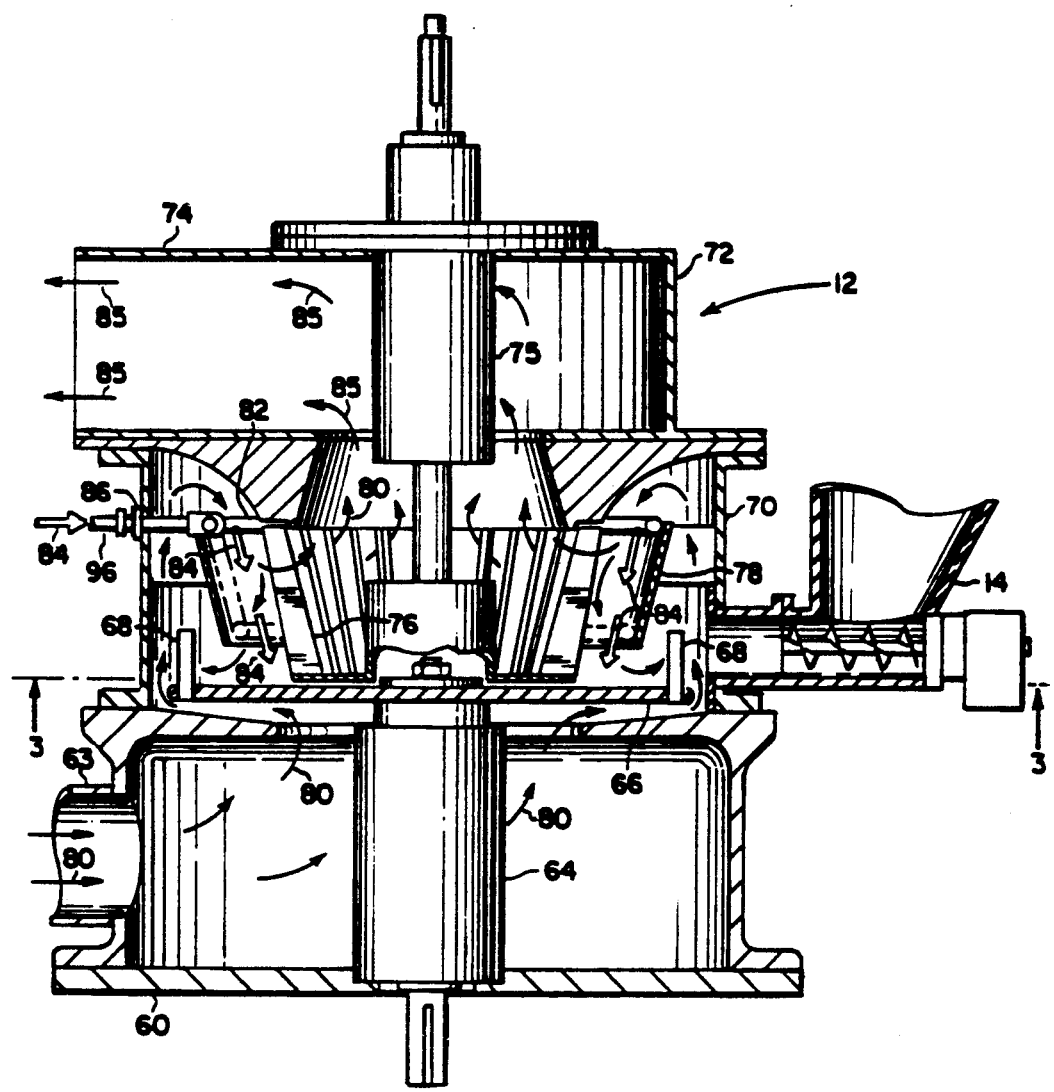
FIG. 2 is a front elevational view, partially in section, of a fluid classification mill modified in accordance with the present invention.

FIG. 2 shows a fluid classification grinding mill such as the ACM Mikro pulverizer identified above which has been modified in accord with the present invention. Mill 12 includes an inlet chamber 60 containing an inlet conduit 64 which in turn is connected to the transition chute 14 of FIG. 1 by suitable fittings (not shown). Chamber 60 contains means for supporting a central rotor 64 which in turn is connected to the pin rotor 66 which supports a plurality of hammers 68. Chamber 60 has mounted thereon a housing 70 which in turn supports a second housing 72 which contains an outlet conduit 74 which in turn is connected to the piping 30 as shown in FIG. 1. Disposed within housings 70 and 72 is a separator shaft and bearing housing 75 which in turn supports the rotatable classifier 76. Disposed within housing 70 and surrounding a portion of the rotating classifier 76 is a shroud and baffle ring 78. Material to be ground is introduced to the mill 12 via a feed hopper and auger device 14 as is well known in the art. This basically is the conventional fluid classification impact grinding mill. In normal operation the material to be ground enters the mill and is contacted by hammers 68. A classification fluid (e.g. nitrogen) enters the mill through inlet conduit 64 as shown by arrows 80 and flows through the mill to drive the particles in the direction shown by the arrows. The ground particles pass through the classifier 76 in accordance with the speed of rotation of the classifier and the selected particles are removed with the nitrogen via the arrows as shown. According to the present invention a spray header or manifold 82 is disposed inside of the shroud and baffle ring 78. Spray header 82 is adapted to direct liquid cryogen, e.g. liquid nitrogen in the direction shown by the hollow arrows 84. Spray header 82 is in turn connected through a suitable fitting 86 to a source of liquid cryogen (not shown). Spray header 82 can be disposed at the top of the shroud and baffle ring, at the bottom thereof as shown by the ghost lines or at any position intermediate thereof depending upon the mill and the degree of cooling and liquid cryogen consumption required. Tests have shown most economical use of liquid cryogen is effected when spray header 82 is disposed at the bottom of shroud and baffle ring 78. Liquid cryogen injected into the mill cools not only the mill, but the product as it is being ground. As the cryogen contacts the particles to be ground, it warms up and it vaporizes the vapors forming part of the product arrows 85 which leave the mill 12 and are conducted towards the cyclone 32 for separation and recycled to the mill as hereinbefore described.

Figure 3:
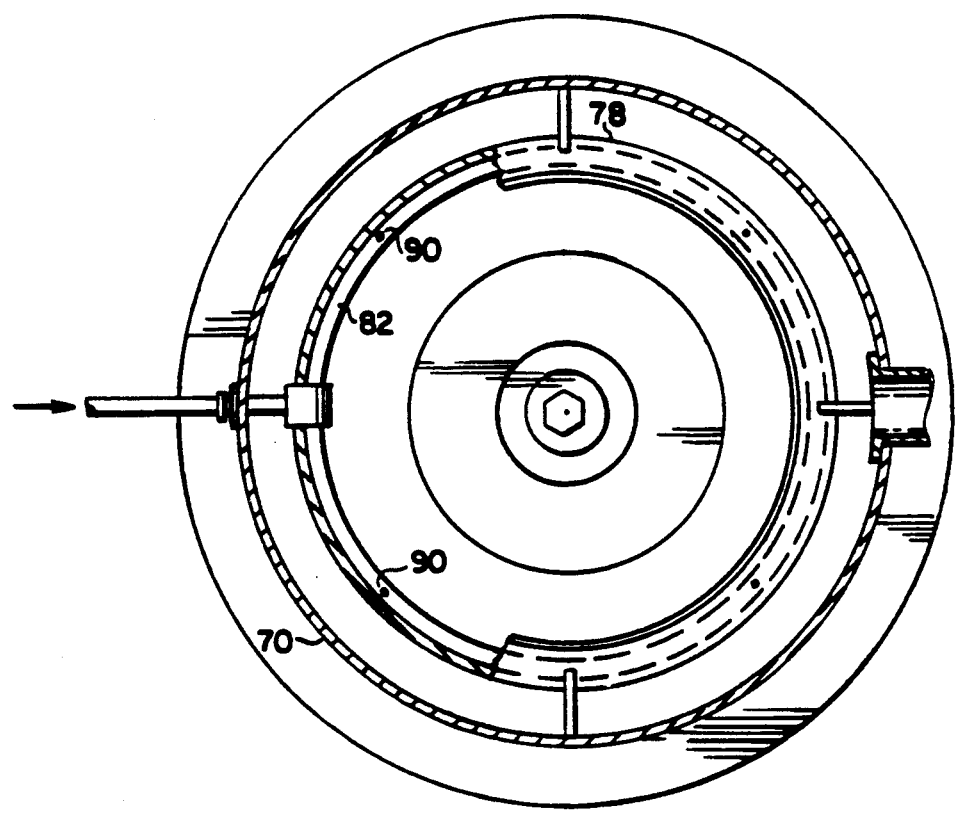
FIG. 3 is a view taken along line 3—3 of FIG. 2.
Figure 4:
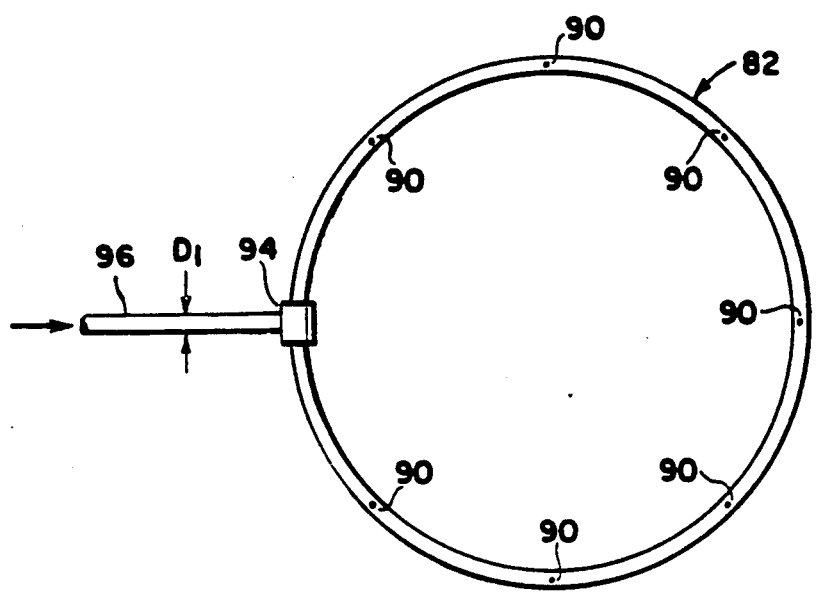
FIG. 4 is a bottom plan view of the manifold according to the present invention.

FIG. 3 shows the shroud and baffle 78 and the housing 70 as well as the spray header 82. Spray header 82 as shown in FIG. 4 is basically a circular tube containing a plurality of orifices or holes 90 for directing the liquid nitrogen towards the product being ground. Spray header 82 is constructed with a suitable manifold 94 so that the liquid cryogen entering the inlet conduit 96 passes to the orifices 90 without diminution.

Utilizing the method and apparatus according to the present invention of the total volume of liquid cryogen (e.g. liquid nitrogen) used, 10–20% is used in the pre-cooler with the balance being used for direct injection into the mill.

Table II shows a series of tests compariaq the process of the instant application against that of an apparatus similar to that of Frable. U.S. Pat. No. 3,771,729 which utilizes a hammermill and a screen classifier.

TABLE II

| | Total Production Rate (Lbs/Hour) | % Passing 80% Mesh (%) | Production Rate of 80 Mesh Product (Lbs/Hour) | LIN Consumption (Lbs LIN/Lb 800 Mesh Product) |
| --- | --- | --- | --- | --- |
| Process of the Present Invention | | | | |
| 1 | 204 | 88 | 180 | 3.4 |
| 2 | 323 | 76 | 95 | 3.7 |
| 3 | 260 | 95 | 247 | 2.7 |
| Hammermill (U.S. | | | | |

TABLE II-continued

|  | Total Production Rate (Lbs/Hour) | % Passing 80% Mesh (%) | Production Rate of 80 Mesh Product (Lbs/Hour) | LIN Consumption (Lbs LIN/Lb 800 Mesh Product) |
|---|---|---|---|---|
| Pat. No. 3,771,724) | | | | |
| 1 | 200 | 78 | 156 | 6.4 |
| 2 | 237 | 58 | 140 | 6.9 |
| 3 | 267 | 49 | 131 | 6.9 |

Referring to Table II, it is clearly evident that the process of the present invention increased the production rate of −80 mesh product (e.g., ground tire thread) by 20% and decreased the liquid nitrogen requirement by 50%. Thus, the present invention is a significant improvement over the prior art.

Having thus described our invention, what is desired to be secured by Letters Patent of the United States is set forth in the appended claims.

We claim:

1. A closed system for fine grinding rubber and plastic material comprising in combination
    means for collecting and conveying said material to a fluid classification grinding mill, said means including means to pre-cool said material to below its embrittlement temperature;
    a fluid classification grinding mill, of the type containing a generally flat disc having a plurality of equally spaced hammers or comminuting devices disposed equally around the peripheral edge of said disc, connected in fluid tight relation to said collecting and conveying means, said mill including means to inject a liquid cryogen onto said material during grinding said liquid cryogen injection means comprising a plurality of inlets uniformly disposed in a circular pattern and placed inside said hammers whereby said cryogen is distributed uniformly through inner parts of said mill;
    removal means to conduct ground material and cryogen vaporized in said mill to separator means;
    separator means to separate such ground material form said vaporized cryogen;
    recirculation means to convey such vaporized cryogen from said separator means to said mill; and
    collection means to recover said ground material as a product.

2. A system according to claim 1 wherein said collecting and conveying means includes a feed hopper and a cooling conveyor with an air lock therebetween.

3. A system according to claim 1 wherein an air lock is disposed between said collecting and conveying means and said fluid classification grinding mill.

4. A system according to claim 1 wherein said separator means includes a cyclone type separator.

5. A system according to claim 1 wherein said circulation means includes a blower the suction side connected to said mill through said cyclone and said output connected to said fluid classification mill.

6. In a fluid classification type grinding mill of the type wherein a normal gaseous fluid is used to convey particles to be ground into the mill and ground particles out of said mill, said mill having a plurality of equally spaced hammers disposed equally around the periphery of a disc, the improvement comprising:
    means to inject a liquid cryogen into the particles during grinding to cool said particles and said mill, said means being a generally circular manifold having a plurality of outlets or nozzles disposed equally around the circumference of said manifold, said manifold placed inside said hammers whereby said cryogen is distributed uniformly throughout parts of said mill.

* * * * *